United States Patent Office 3,261,896
Patented July 19, 1966

3,261,896
BURNED BRICK PARTICULARLY SUITED FOR USE IN OXYGEN STEELMAKING
Ben Davies and Ernest P. Weaver, Pittsburgh, Pa., assignors to Harbison-Walker Refractories Company, Pittsburgh, Pa., a corporation of Pennsylvania
No Drawing. Filed Mar. 31, 1965, Ser. No. 444,383
11 Claims. (Cl. 264—65)

This application is a continuation-in-part of application Serial No. 429,609, now abandoned, by Ben Davies and Ernest P. Weaver, filed February 1, 1965, entitled "Burned Refractory Particularly Suited for Use in Oxygen Steelmaking."

This invention relates to refractory brick particularly suited for use in lining vessels for the oxygen steelmaking process. In a particular embodiment, it relates to novel practices in treating of tar-bonded, basic refractories to recover very stable, ceramically bonded, basic refractories containing free lime. By "free lime," we intend to describe refractories that contain at least about 2% lime, not in chemical union with other constituents; for example, not in union with minor impurity quantities of iron oxide, aluminum oxide, and the like mineral oxides normally expected in basic refractories of the magnesitic or dolomitic type.

In one aspect, the invention relates to ceramically bonded, tar impregnated, basic refractories having from 2 to 100% free lime (calculated as CaO); and a total MgO+CaO content, on an oxide basis, on the order of at least about 90%, by weight. The remainder of the brick on an oxide basis is, in large part, silica and various $R_2O_3$ oxides such as $Al_2O_3$, $Cr_2O_3$, and $Fe_2O_3$, with these latter three oxides preferably constituting no more than about 3% of the total weight of the refractory.

The oxygen steelmaking process, variously designated as the LD Process, the Kaldo Process, or, simply, oxygen steelmaking, requires the use of a unique vessel, which is in some ways similar in shape to the well-known Bessemer and Thomas converters, which vessel is lined with refractory. A basic slag is produced in the oxygen steelmaking process and, accordingly, a basic refractory of the type above described is suitable and desired. This factor has led to the widespread use, both in this country and Europe, of the dead burned dolomite or dead burned dolomite-magnesite mixtures bonded with a cokable, nonaqueous tar or pitch. While such tar bonded refractories (unburned brick) are commonly used, it has become increasingly evident something in addition to a mere tar or like nonaqueous, carbonaceous bond system is necessary.

Two means of improving the physical properties of a high-lime basic system including a nonaqueous, cokable, carbonaceous material are to bake or temper the brick or else burn, i.e., ceramically bond, the brick. The baking of tar bonded brick is known. A particularly satisfactory and contemporary process for producing good, baked, tar bonded brick is disclosed in our copending application Serial No. 279,012, now United States Patent No. 3,168,602 filed May 8, 1963, which application is assigned to the same assignee as the present invention. Satisfactory burned, high-lime content brick can be provided by the process disclosed and claimed in copending United States application Serial No. 304,609, now United States Patent No. 3,196,193 filed August 26, 1963, by Ben Davies and Oscar Milton Wicken. This latter application is also owned by a common assignee. The present invention relates to improvements in the processes of these copending applications, to provide both baked and also ceramically bonded refractory shapes containing an appreciable quantity of free lime. Thus, an object of this invention is to provide for the fabrication of both baked and ceramically bonded, preferably tar impregnated brick containing free lime. A further object of the invention is the provision for more efficient and easier commercial fabrication of tar-impregnated, ceramically bonded, basic refractory shapes, as above defined, particularly suited for use in oxygen steelmaking processes.

According to the present invention, our process consists essentially of the following:

A high, free-lime content, basic refractory aggregate material is size graded according to conventional brickmaking techniques to provide a brickmaking batch. The batch is mixed with from 3.5 to 6.5%, by weight, based on the weight of the refractory, of a cokable, nonaqueous, carbonaceous, bonding agent. The agent may be one or more materials selected from the art-recognized materials termed tar and/or pitch derived from either or both coal or petroleum base material. Such materials include so-called soft pitch, medium pitch, hard pitch, sometimes creosote, etc. A good discussion of various pitches will be found in our United States Patent Number 3,070,449, entitled "Refractory Practices." For the processes of this invention, almost any combination of cokable, nonaqueous, carbonaceous, bonding agents can be used as long as the softening point (cube in water testing method) of the selected agent or mixture of agents is above about 85° C.

The mixture of size graded refractory material and bonding agent, which agent is heated to a temperature of about 50° C over its softening point, is formed into shapes on a conventional brick press at a pressure in the range 4000 to 10,000 p.s.i. We prefer to press at about 8000 p.s.i. Our preferred bonding agent consists of two parts, by weight, of the hard pitch and four parts, by weight, of the medium pitch, for a total of six parts, by weight, all based on the total weight of the refractory with which they are mixed. Our preferred grain is dead burned dolomite having no more than about 2%, by weight, of ingredients other than CaO and MgO; for example, 55% by weight of CaO, about 43%, by weight of MgO, the remainder being $SiO_2$, $Fe_2O_3$, and like constituents which naturally occur in high purity dolomite ore. A satisfactory and preferred sizing for the refractory batch is as follows: passing a 4 and resting on a 10 mesh screen—about 25%, passing a 10 and resting on a 28 mesh screen— about 48%, passing a 28 mesh screen—about 35%. From about 40 to 60% of the pass —28 mesh fraction rests on a 325 mesh screen. Of course, this sizing should be considered an exemplary one only. Those skilled in the art will understand that modifications can be made in it, and good brick will still be obtained. Further, while a brick batch may be fabricated with certain weight quantities of various fractions according to a precise recipe, subsequent handling, mixing, pressing, and like treatment steps will cause variation in the overall size gradation of particles found in a resulting burned brick. Most conventionally, one expects the overall size gradation to be finer, due to breakage of larger grains.

After the brick have been formed as above noted, they are placed or stacked one-high and out of contact with each other on a flat supporting surface that can withstand subsequent baking temperatures without destruction or undue deformation. We prefer a flat steel pallet. The palletized brick are placed in a kiln and baked to a temperature in the range of about 350 to 500° F. The atmosphere of the kiln or furnace in which the baking occurs is a desiccated atmosphere. Products of combustion and vapors evolving from the brick during the bake, must be constantly removed. We suggest the continual or continuous introduction of a stream of hot, desiccated air during the entire baking operation in order to assure a constant sweeping away of evolving volatiles and any moisture which may be present. The practical maximum of water in the "desiccated" air of our invention is 50 grains per pound of air.

We prefer to bake at about 500° F., since this only takes about two hours. At the lower temperature of about 350° F., more on the order of seventy-two hours is required, and one can see that a time-temperature relationship is present in which the lower the temperature the longer the baking time needed. The actual baking temperature can be varied by one skilled in the art in order to obtain the necessary properties in the resulting baked shape. According to our invention, broadly, it is necessary that the resulting baked shape have been heat treated for a sufficient time and at such a temperature as to obtain a refractory shape of sufficient strength to resist a 50 p.s.i. load at 1000° F. for about two hours with no more than about 3% subsidence.

The resulting baked brick are allowed to cool. They may be cooled to room temperature if desierd. In any event, they are cooled sufficiently to allow easy handling. When burned brick are to be fabricated, the cooled brick are set in a kiln, or on a kiln car in the case of a tunnel kiln. Since they have good strength, they may be stacked; for example, five-high or more, although we do not recommend more than seven-high. The brick are then fired to a temperature in the range 2400 to 3000° F. We also find it desirable that the rate at which the kiln is heated to obtain the final firing temperature be somewhat slow; for example, on the order of three to five hours to obtain a temperature of 1000° F, to allow for oxidation of remaining carbonaceous constituents within the brick. We suggest the final firing temperature be maintained for on the order of ten hours.

After firing, the brick are removed from the kiln and cooled. It is preferable that they then be subjected to impregnation with a cokable, carbonaceous, bonding agent of the type above discussed. This may be accomplished, for example, by immersing the brick while still relatively warm, for example at about 300 to 500° F., in a bath of the bonding agent until they are impregnated or at least coated. We find one or two minutes submersion in the bath adequate to coat.

Of course, if one desires to recover baked brick rather than burned brick, the process is interrupted after the baking stage and the brick cooled to on the order of 200 or 300 to 500° F. and then preferably but not necessarily dipped or submerged in a bath of additional carbonaceous agent, of the types as discussed various places above.

We have found the quantity of bonding agent in the initial tar bonded brick to be subjected to our process to be important. In comparative tests, we made burned brick with only 4% of bonding agent, which brick were identical in all other respects to those made according to our preferred embodiment, above discussed, except our preferred brick had a 6% bond content. After firing, the difference between the brick containing the 4% bond (not baked) and those containing the 6% bond (baked) and an additional group of 6% bond content brick (not baked) was almost unbelievable. The brick which originally had a 6% bond content (baked) had a fine ring, were well filled out with very sharp edges and corners, and had other attributes one wishes in a well made, ceramically bonded brick. Those which originally had the 4% bond, however, depending upon the tier in which they were located during the firing, showed varying degrees of bloating, spalling, peeling, cracking, and bursting and were, in general, the antithesis of what one wishes in a good, ceramically bonded brick. The 6% content brick (not pre-baked) were also very poor. In additional tests, brick having 4% bond were baked according to our process and then fired. These were found to also be exceptionally good brick. Thus, we suggest 4% of bonding agents when burned brick are the ultimate product and 6% when baked brick are the final product.

Practically all of the foregoing discussion has been with relation to all-dolomite brick. As is understood from the objects of this invention, the process is equally applicable to brick of lesser free-lime content. For example, it is applicable to brick of the analyses disclosed in United States Patent No. 3,141,784; namely, batches of refractory material consisting essentially of, by weight, at least 96% of MgO and CaO, on an oxide basis, the MgO ranging from about 95–50%, and the CaO ranging from about 5–50%. The $SiO_2$, $Al_2O_3$, and $Fe_2O_3$ constituents, which occur with this type of grain, are essentially maintained below about 4%. Thus, the present process is applicable to manufacturing brick from batches of the common basic refractory materials: calcia, magnesia, dolomite, and mixtures thereof. These materials or mixtures thereof can be preformed into homogeneous, coburned grain, if one desires, as, for example, in the manner disclosed and claimed in United States Patent No. 3,060,000. As to whether or not they are coburned, however, it is, of course, understood that the magnesia brick batch ingredient must be a dead burned magnesite, dead burned dolomite or hard-fired lime.

In the foregoing discussion, all chemical analyses are on the basis of an oxide analysis, in conformity to the usual practices of reporting the chemical analysis of refractory materials.

Also, all size gradation is according to the Tyler series of screens.

Schematically, our process consists of the following stages:

*Step 1.—Through baking*

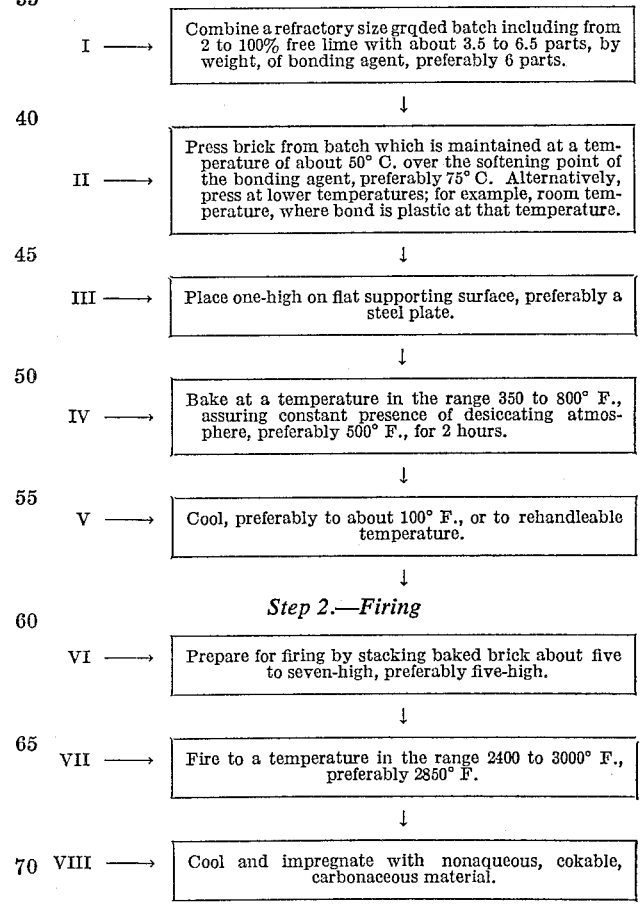

*Step 2.—Firing*

This successful manufacturing of burned brick, in particular burned dolomite brick—as discussed in the foregoing explanation of the invention—is, in essence, a two-step process. The first involves an essential and carefully-controlled baking step, which gives the brick a physical stability allowing a multi-unit setting; and the second essential step is the firing step.

Two major problems of firing refractory brick containing free lime, which phrase is aptly descriptive of dolomite brick, involve the facts that (1) they hydrate during the burn and even during manufacture before burning, and (2) they are just not sufficiently strong to support load.

Even a mere solution to the two major problems, just discussed, does not lead one to a practical commercial process. For example, it might be possible to so control the manufacturing and burning process that these free lime-containing brick could be burned one at a time; but burning brick one at a time is simply not a commercial operation, for economic reasons, nor is it desirable to develop a mass firing process wherein the brick can be set only one-high, at least in view of the present state of the art. Nearly all types of the existing firing equipment, especially including high production tunnel kilns, have a ware setting heighth of 15 to 36 inches, for example. It is necessary that the brick on the bottom-most tier of the stack of ware be able to support the superimposed mass of other brick comprising the remainder of the setting.

The solution of this problem has been a very difficult one in the firing of refractories containing free lime. The primary reason is that, to protect the brick from hydration in manufacture and—to some degree—in firing, it has been the practice to select a nonaqueous, cokable, pitch-like bond, and to press the brick at an elevated temperature so that the bond will be fluid and will flow over the aggregate grains to lubricate them and to protect them from atmospheric moisture. The persistent problem which has developed in firing of such shapes is that any heating step subsequent to forming serves to soften the bond so as to make the brick poorly resistant to load, and frequently leading to collapse of any multibrick setting. In cases where collapse does not actually occur, there are other effects which bring about losses of ware, these including subsidence so as to distort the brick, the actual shelling off of areas from the sides of the brick and failure to completely burn out the pitch bond.

It has been thought that this problem could be solved by so diminishing the amount of pitch-like materials used for bonding that only a minor amount of softening would develop on subsequent heating as occurs in the early stages of firing. However, this makes it difficult to form the brick by pressing so as to achieve the desired high density, and it also increases the probability of hydration because there is not enough bond coating to amply protect the grains.

We have found, according to the present invention, that the advantages of pitch-type bonds in hydration resistance can be retained, and the advantage of multi-heighth setting can be achieved, if we interpose between the forming and firing steps the novelty of a baking treatment, above outline, a one-high setting of brick. During the baking step, the bond is modified in some manner and becomes rigidified. Thereafter, the brick can be reset to multi-heighth settings, as used conventionally for other types of refractories, without fear of collapse and other manifestations of poor strength normally associated with the hydration of brick having a high free lime content.

The baking treatment is carried out at such temperatures and for such time periods as to drive off lower-temperature volatiles, thereby obtaining a rigid, carbonaceous structure of bonding films surrounding the aggregate grains within the rock. Still further, in the initial fabrication of the brick at the press, there is inherently cracking of larger grains making them even more susceptible to hydration; but our baking treatment overcomes this by forming the films just noted. Thus, what we accomplish at this intermediate stage of manufacture is a brick which is then capable of being reset with little concern regarding load strength with the assurance it will not collapse in firing, nor crack, nor kiln mark, nor slump. Further, the baking step renders the brick hydration-resistant beyond the degree it must essentially possess in order to withstand subsequent tunnel kiln atmospheres without damaging hydration.

One of the other problems in the prior attempts to quickly fire brick with a minimum of delay after their pressing, and without the baking step, is that the individual brick stick together badly because the pitch in one brick, upon softening, has no compulsion to remain within that brick, but tends to flow to the adjoining brick giving a unitized structure where one is not wanted.

To recapitulate, in any one-step process utilizing freshly-manufactured brick hastened to the firing process, as has been practiced for refractories containing free lime, the brick have shown either deformation or collapse or have been confined to such low-setting heights as to give low production and to render the firing operation uneconomic. On the other hand, our process of prematuring the bond so that it will be nonsoftening allows these products to be fired by the tonnage methods of multi-heighth setting, which are usual for other simpler kinds of refractories.

Our process has the further advantage that the bonds do not have to be chosen to allow them to stand up in a multibrick stack through the bond-softening temperature range below about 1000° F. Through initial exposure in this temperature range, our brick are set only one-high and support only their own weight. This allows a free choice of bonds directed to the more vital aspects of bonding and of brick quality. We may fully protect the aggregates against hydration, and need not worry about collapse of the setting within the kiln. We may choose to use amounts and kinds of bonds which will open up the structure to make the brick more amenable to impregnation subsequent to firing. This, in fact, is an objective which has not previously seemed attainable, consideration of it having been precluded by the problems of successful firing which have previously been paramount and have operated under handicaps not present in our process. Under these prior circumstances, impregnation has been viewed as a step aimed at merely coating the surfaces and obtaining such impregnation, for example, with molten pitch, as to allow the brick to be shipped and placed in service without hydration. We find that, with the greater latitude of our process, it is possible to so choose the bonds as to generally allow a deeper penetration, and to give more thought to the amount of carbon which can thus be deposited within the pores of the brick. This retained carbon is especially useful in oxygen steel-making refractories.

Having thus described the invention in detail and with sufficient particularity as to enable those skilled in the art to practice it, what is desired to have protected by Letters Patent is set forth in the following claims.

We claim:

1. A process for fabricating ceramically bonded basic refractory brick containing from 2 to 100% free lime, consisting essentially of (1) preparing a refractory brick-making batch by mixing together free lime-containing basic refractory grain and nonaqueous, cokable, carbonaceous, bonding agents (2) forming brick from the batch, (3) arranging the brick only one-high on a flat supporting surface, and (4) subjecting the brick to baking in an essentially desiccated atmosphere in the range 350 to below about 1000° F. for a time period sufficient to obtain a baked brick of sufficient strength to thereafter be capable of being stacked to multiunit heights without fear of collapse or hydration when fired to elevated burning temperatures in a tunnel kiln, (5) allowing the brick to reach a handleable temperature, (6) recovering the brick, (7) restacking the brick more than one brick high, (8) placing the restacked brick in a tunnel kiln, and (9) firing to a burning temperature sufficient to recover a ceramically bonded, basic refractory brick.

2. The process of claim 1 in which the bond content amounts to about 4%, by weight, based on the weight of the refractory.

3. The process of claim 1 in which the softening point of the bond, cube in water, is at least about 85° C.

4. A process of fabricating ceramically bonded, high-lime content, basic refractory brick, consisting essentially of preparing a brickmaking batch by mixing together high-lime content refractory grain and from 3.5 to 6.5% based on the weight of the refractory, of nonaqueous, cokable, carbonaceous, bonding agent, forming brick from the batch, stacking the brick one-high on a flat supporting surface and subjecting the brick to baking in an essentially desiccated atmosphere at a temperature in the range 350 to below about 1000° F. for a time period sufficient to obtain a baked brick of sufficient strength to be thereafter capable of being stacked to multiunit height in a subsequent firing stage, allowing the brick to reach a handleable temperature, recovering the brick and restacking the brick more than one brick high, placing the restacked brick in a furnace and firing to a temperature in the range 2400 to 3000° F., recovering a ceramically bonded, high-lime content brick.

5. The process of claim 4 in which the batch of refractory and bond is at a temperature at least about 50° C. over the softening point of the pitch for forming.

6. The process of claim 4 in which the baking is carried out at a temperature on the order of 500° F. for about two hours.

7. The process of claim 4 in which the firing temperature of 2400 to 3000° F. includes an initial relatively slow heating rate of at least about three hours to a temperature of about 1000° F.

8. The process of claim 4 in which the fired brick are impregnated throughout with a nonaqueous, cokable, carbonaceous material.

9. The method of claim 1 in which the period and temperature of the baking is sufficient to obtain a shape thereafter capable of withstanding a 50 p.s.i. load at 1000° F. with no more than 3% subsidence.

10. A process of fabricating baked, basic refractory brick consisting essentially of preparing a brickmaking batch of basic refractory grain to provide a batch having from 2 to 100% of free lime and mixing the batch with from about 3.5 to about 6.5%, by weight, based on the weight of the refractory, of nonaqueous, cokable, carbonaceous, bonding agent, forming brick from the batch, stacking the brick one-high on a flat supporting surface and subjecting the brick to a baking step in an essentially desiccated atmosphere at a temperature in the range 350 to below about 1000° F. for a time period sufficient to obtain a baked brick capable of thereafter withstanding multiheighth stacking in a firing step in a tunnel kiln, said desiccated atmosphere being essentially retained throughout the baking step, allowing the brick to reach a handleable temperature, recovering baked brick.

11. The process of claim 10 in which the recovered baked brick are then dipped in a batch of additional nonaqueous, cokable, carbonaceous, bonding material.

References Cited by the Examiner
UNITED STATES PATENTS 3,196,193  7/1965  Davies.

ROBERT F. WHITE, *Primary Examiner.*

R. B. MOFFITT, *Assistant Examiner.*